P. KRUSE.
CAN MAKING MACHINE.
APPLICATION FILED APR. 30, 1918.
1,333,550.
Patented Mar. 9, 1920.
2 SHEETS—SHEET 1.
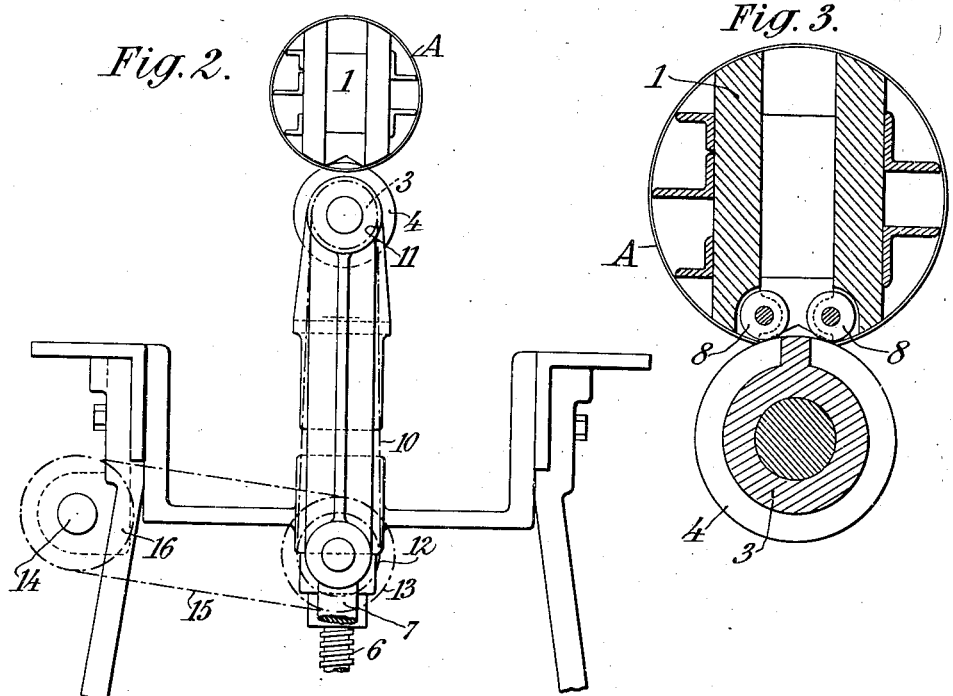
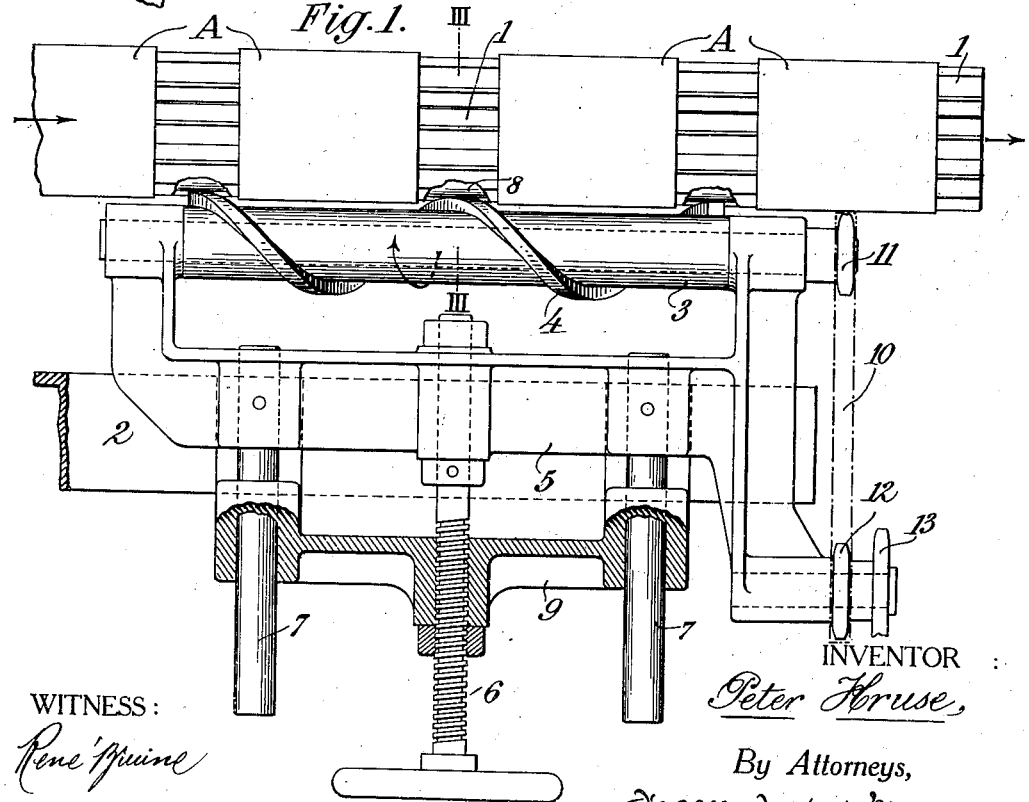

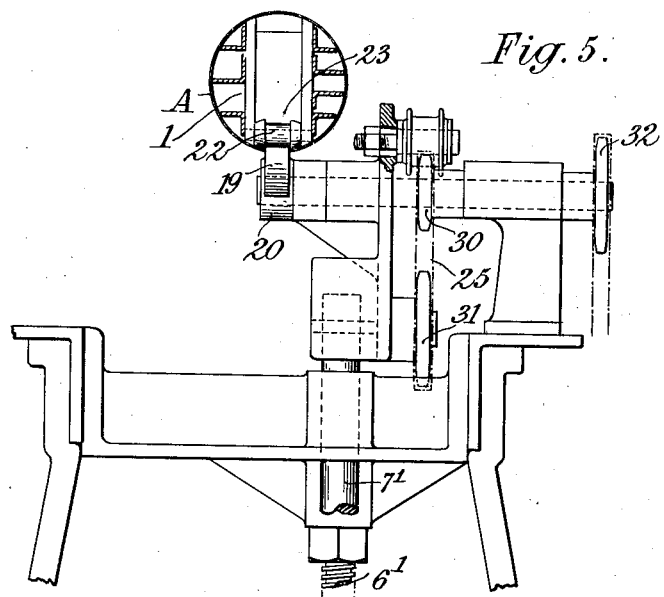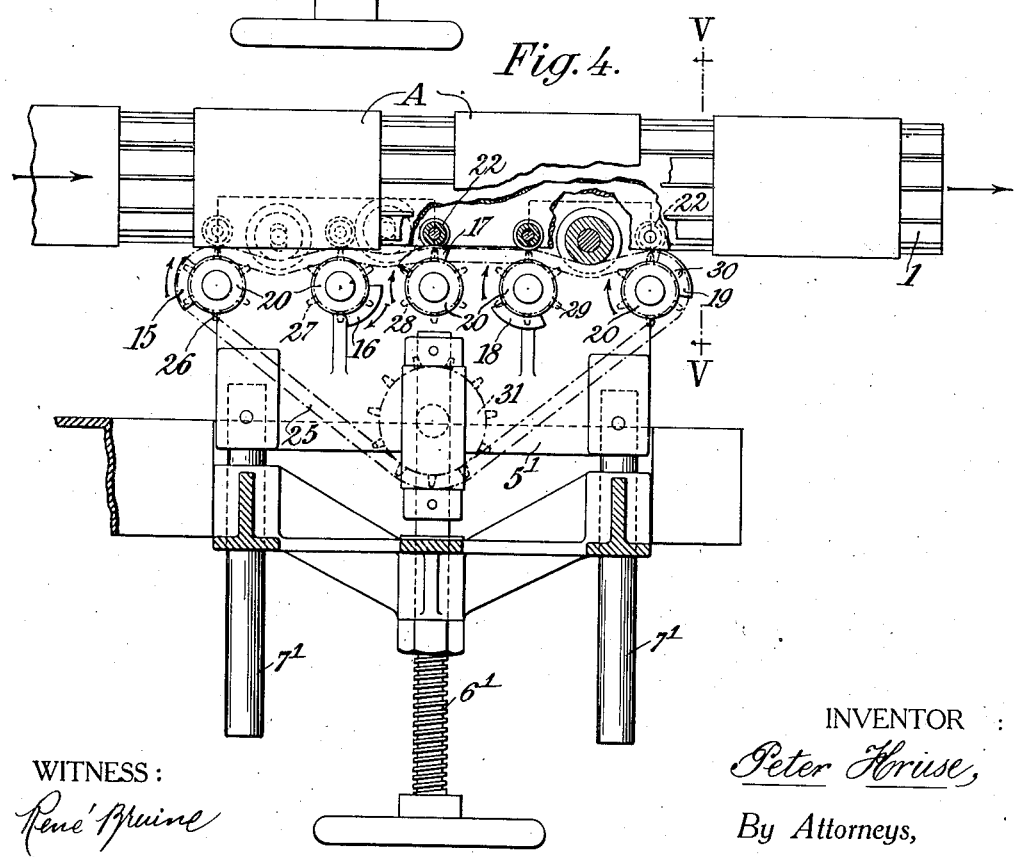

# UNITED STATES PATENT OFFICE.

PETER KRUSE, OF BROOKLYN, NEW YORK, ASSIGNOR TO E. W. BLISS COMPANY, OF BROOKLYN, NEW YORK, A CORPORATION OF WEST VIRGINIA.

CAN-MAKING MACHINE.

1,333,550.     Specification of Letters Patent.     Patented Mar. 9, 1920.

Application filed April 30, 1918. Serial No. 231,608.

*To all whom it may concern:*

Be it known that I, PETER KRUSE, a citizen of the United States of America, residing in the borough of Brooklyn, county of Kings, and State of New York, have invented certain new and useful Improvements in Can-Making Machines, of which the following is a specification.

This invention relates to a machine for making cans, and aims to provide improvements therein.

The bodies of tin cans are now largely made upon a machine known as a body maker, and this machine (when the cans are to be of the sealed type) comprises a horn extension or solder-horn, onto which the tubular can bodies pass from the forming horn. The tubular can bodies pass along the solder horn, and while thereon have solder applied to the seam where the two ends of the body blank are joined.

Solder-horns, as usually made at the present time, are supported at or near the end where the can bodies pass off of the same, by a roller, the can bodies, as they move along the solder-horn, passing between the roller and the solder-horn. As each can body passes between the roller and solder-horn, there is a little bump or jar, due to the thickness of the tin of the can bodies.

There are, at the present time, machines upon which can bodies are formed at very nearly the rate of 200 cans per minute. In the very near future, it may be predicted, these machines will be operated at a speed of somewhat more than 200 bodies per minute. At such a rate of speed the bumps or shocks occasioned by the can bodies passing between the solder-horn and a roller support, become very considerable, and, in fact, objectionable, inasmuch as these bumps or jars are sufficient to detach or shake solder from the seam, and hence produce defective or leaky cans.

The present invention provides an improved mechanism or combination, wherein the solder-horn is supported in such manner that bumps or shocks are avoided as the can bodies pass the support for the solder-horn at or near its discharge end.

The invention also provides a mechanism of the character referred to, which is very simple in construction, and efficient in operation.

Two embodiments of the invention are illustrated in the accompanying drawings.

In said drawings,—

Figures 1, 2 and 3 illustrate what is at present considered the preferred embodiment of the invention;

Fig. 1 illustrates the invention in side elevation, only one end of the solder-horn being shown;

Fig. 2 is an end elevation of the construction shown in Fig. 1;

Fig. 3 is a cross-section on the line III—III of Fig. 1;

Fig. 4 is a side elevation of the second embodiment of the invention;

Fig. 5 is a sectional view on the line V—V, Fig. 4;

Referring to said drawings, numeral 1 designates a horn extension or solder-horn of any suitable construction, this solder-horn being usually directly connected at its receiving end to the forming horn of a body-maker.

A, A designates a series of tubular can bodies, which are advanced along the solder-horn in any suitable manner.

2 designates the solder-horn support.

The solder-horn support has portions which bear successively upon the solder-horn at various points longitudinally thereof, in such manner that the can bodies A may pass, without the can bodies being directly interposed between the solder-horn and the part of the solder-horn support which is acting to support the solder-horn.

As shown in the embodiment illustrated in Figs. 1, 2 and 3, the support 2 comprises a rotating part or hub 3 having a spiral rib or projection 4 thereon. The part 3 is preferably carried in a bracket 5, and means, such as a screw-shaft 6, is preferably provided for raising and lowering the bracket 5. This adjustability of the solder-horn support permits of the support being brought into position to support solder-horns of different diameters or heights. Guides 7 for the bracket 5 are preferably provided. These guides 7 pass through holes in the frame 9 of the machine.

The underside of the solder-horn is preferably provided with two spaced rollers 8, 8 (Fig. 3). These rollers minimize wear between the solder-horn and the solder-horn support. Moreover, the space between the rollers 8, 8, or points of contact with the rib 4, provides a stable poise of the solder horn on the support, and prevents the solder-horn from moving laterally.

The part 3 is conveniently rotated by means of a chain 10 and sprockets 11 and 12. The sprocket 12 is preferably fast to a sprocket 13 which is driven by a moving part of the machine, such as the shaft 14, through a suitable chain 15 and sprocket 16.

The pitch of the rib 4 is preferably greater than the height of the maximum size can body which the machine is designed to form. The can bodies are fed at such a rate that they move the distance of one pitch of the rib 4 for each rotation of the part 3.

In the embodiment shown in Figs. 4 and 5, there is provided a plurality of supporting projections 15, 16, 17, 18, 19. These projections are carried by a hub or hubs 20, here shown as a plurality of hubs mounted transversely of the solder-horn. A single hub 20, however, carrying the projections 15, 16, 17, 18 and 19, could be mounted longitudinally of the solder-horn.

The solder-horn preferably has anti-friction rollers 22 with which the projections 15, 16, 17, 18 and 19 contact. These rollers may be grooved, as indicated at 23, so that the engagement of the parts 15, 16, 17, 18, 19, therein, prevent lateral displacement of the horn.

The hubs 20 are mounted in a bracket 5', which is adjustable vertically by means of a screw 6' similarly to the bracket 5 in the embodiment shown in Figs. 1 to 3, inclusive.

The hubs may be conveniently driven by a chain 25 passing over sprockets 26, 27, 28, 29 and 30, upon the hubs, and an idler sprocket 31. The chain may be driven by a sprocket 32 fixed to the shaft of one of the hubs or sprockets, as the hub and sprocket 20, 30.

The combined length or angularity of the projections 15, 16, 17, 18 and 19 is preferably somewhat in excess of 360°.

The hubs carrying the projections 15, 16, 17, 18 and 19 are driven at such a rate, and the projections are so disposed angularly upon the hubs, that they bear successively upon the solder-horn (or in front) of each can body as it is advanced along the solder-horn.

It will be seen that the mechanism in both embodiments acts to continuously support the solder-horn, and that bumps or shocks as the can bodies pass the solder-horn support, are avoided.

The invention may be embodied otherwise than as herein illustrated and specifically described.

A divisional application, Serial No. 267,419 covering the subject-matter illustrated in Figs. 4 and 5, has been filed.

What I claim is:—

1. A machine for making cans, comprising a solder-horn and means for supporting the same, said means comprising a rotary means having portions adapted to contact successively with different portions of the horn in the direction of the travel of can bodies on the horn, each of said contacting portions having a true circular movement, and the axis around which each portion moves being fixed.

2. A machine for making cans, comprising a solder-horn and means for supporting the same, said means comprising a rotary means having portions adapted to contact successively with different portions of the horn in the direction of the travel of can bodies on the horn, each of the said contacting portions having a true circular movement, and the axis around which each portion moves being fixed, said horn and supporting means having between them means for preventing lateral displacement of the horn.

3. A machine for making cans, comprising a solder-horn and means for supporting the same, said means comprising a rotating means having portions adapted to contact successively with different portions of the horn in the direction of the travel of can bodies on the horn, each of the said contacting portions having a true circular movement, and the axis around which each portion moves being fixed, said horn having a groove or recess into which said supporting surface extends.

4. A machine for making cans, comprising a solder-horn and means for supporting the same, comprising a rotating part having a spiral rib thereon, adapted to contact with said solder-horn.

5. A machine for making cans, comprising a solder-horn and means for supporting the same, comprising a rotating part having a spiral rib thereon, and means for turning said rotating part, said turning means turning the rotating part one revolution during the time the feed means advances a can body a pitch length of the spiral rib.

In witness whereof I have hereunto signed my name.

PETER KRUSE.

Witnesses:
 EDWIN B. PEET,
 EDWARD T. REDHEAR.